US012525830B2

(12) United States Patent
Lee

(10) Patent No.: US 12,525,830 B2
(45) Date of Patent: Jan. 13, 2026

(54) ROTOR HAVING SLANTED ANGLE SIDE SURFACE AND LAMINATIONS MADE THEREWITH

(71) Applicant: GM GLOBAL TECHNOLOGY OPERATIONS LLC, Detroit, MI (US)

(72) Inventor: Jinho Lee, Seoul (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 382 days.

(21) Appl. No.: 18/339,790

(22) Filed: Jun. 22, 2023

(65) Prior Publication Data

US 2024/0429759 A1   Dec. 26, 2024

(51) Int. Cl.
  *H02K 1/24*   (2006.01)
  *H02K 15/022*  (2025.01)

(52) U.S. Cl.
  CPC ............. *H02K 1/24* (2013.01); *H02K 15/022* (2013.01)

(58) Field of Classification Search
  CPC ...... H02K 1/22; H02K 15/025; H02K 15/022; H02K 1/24
  See application file for complete search history.

(56) References Cited

U.S. PATENT DOCUMENTS

| 5,266,859 A | * | 11/1993 | Stanley | ................ | H02K 19/103 |
| | | | | | 310/216.012 |
| 8,102,092 B2 | * | 1/2012 | Tomohara | .............. | H02K 1/148 |
| | | | | | 310/216.008 |

FOREIGN PATENT DOCUMENTS

| JP | 54141313 A | | 11/1979 |
| JP | 55061260 A | | 5/1980 |
| JP | 2002315237 A | | 10/2002 |
| JP | 2020127288 A | * | 8/2020 |

OTHER PUBLICATIONS

JP-2020127288-A machine translation Sep. 4, 2025.*

* cited by examiner

*Primary Examiner* — Leda T Pham
(74) *Attorney, Agent, or Firm* — Ingrassia Fisher & Lorenz, LLP | IF&L

(57) ABSTRACT

A rotor disk having a plurality of space apart teeth, each tooth having a transverse portion having s first and second end portion each having an angled side face forming an angle that is not 90 degrees with respect to a top surface or a bottom surface of the rotor disk.

20 Claims, 5 Drawing Sheets

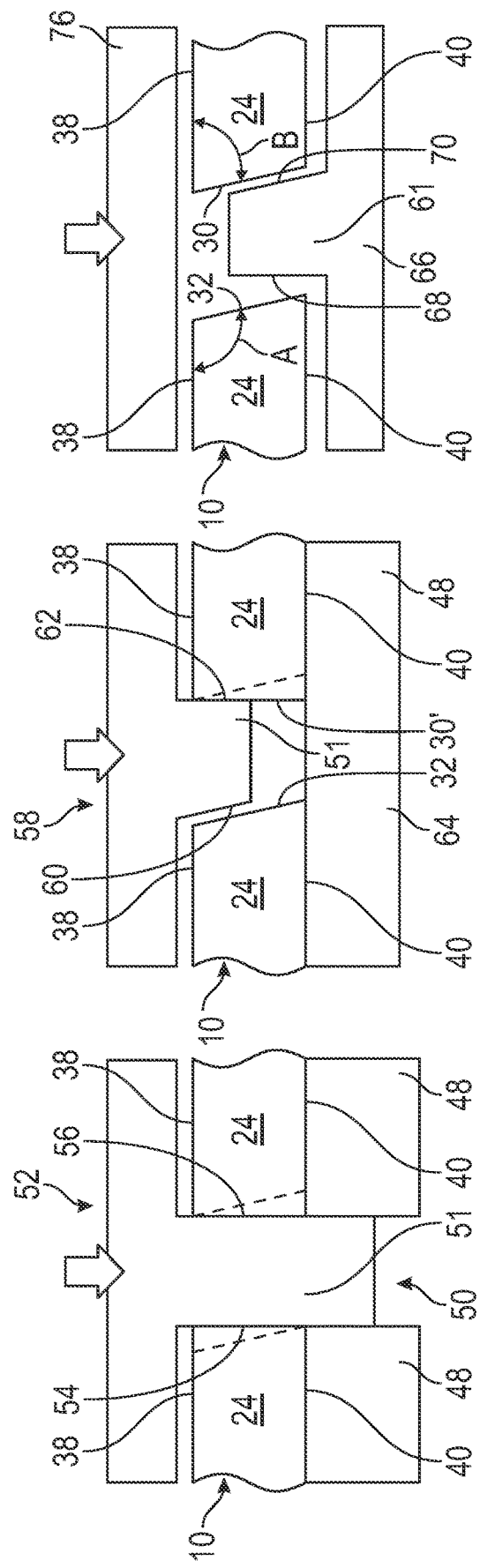

ns,830 B2

ROTOR HAVING SLANTED ANGLE SIDE SURFACE AND LAMINATIONS MADE THEREWITH

INTRODUCTION

The technical field generally relates to rotor useful in brushless and brush electric motors and more particularly relates to rotors having a slanted angle side surface.

A rotor may include a stack of disks having an annular body portion having a through hole formed therein to receive a shaft of an electric motor. A plurality of spaced apart teeth may extend radially from the annular body portion. Adjacent teeth of a disk are separated from each other at a terminal end of each the tooth by a gap. In some configurations of stacked disks used in constructing a rotor the gap must be enlarged to allow for conductive material to be wound through each gap and into a space separating adjacent teeth. However, when disks are stacked so that adjacent disks are rotated with respect to each other sharp edges are exposed that can damage the conductive material during the winding process.

Accordingly, it is desirable to provide a rotor disk so that a plurality of such rotor disks can be stacked with adjacent disks being rotated with respect to each other to provide a skewed channel formed by gaps between rotor teeth without exposing sharp corners of the rotor teeth that can damage conductive material during the winding process.

SUMMARY

A number of variations may include a product including a rotor disk having a central body portion and having a through hole formed therein, and a plurality of spaced apart teeth extending radially from the central body portion, wherein each tooth of the plurality of teeth includes an elongated stem portion having a first end at the central body portion, and wherein the elongated stem portion extends radially to a second end terminating at a transverse portion, the transverse portion may have a general arch shape and extending in a first direction from a first side edge of the stem portion and extending in an opposite second direction from a second side edge of the stem portion, a first end of the transverse portion having a first side face that is not formed at a 90-degree angle with respect to a top face or a bottom face of the rotor disk and a second end of the transverse portion having a second side face that is not formed at a 90-degree angle with respect to the top face or the bottom face, transverse portions of adjacent teeth forming a gap therebetween.

A number of variations may include a product including a plurality of rotor disks, each rotor disk having a central body portion and having a through hole formed therein, and a plurality of spaced apart teeth extending radially from the central body portion, wherein each tooth of the plurality of teeth includes an elongated stem portion having a first end at the central body portion, and wherein the elongated stem portion extends radially to a second end terminating at a transverse portion, the transverse portion may have a general arch shape and extending in a first direction from a first side edge of the stem portion and extending in an opposite second direction from a second side edge of the stem portion, a first end of the transverse portion having a first side face that is not formed at a 90-degree angle with respect to a top face or a bottom face of the rotor disk and a second end of the transverse portion having a second side face that is not formed at a 90-degree angle with respect to the top face or the bottom face, transverse portions of adjacent teeth forming a gap therebetween, wherein the plurality of rotor disks are stacked on top of each with adjacent rotor disks being rotated with respect to each other so the gap between transverse portions of adjacent teeth on each disk is aligned with the gap between transverse portions of adjacent teeth on an adjacent rotor disk to form skewed channel running the longitudinal length of the plurality of rotor disks.

A number of variations may include a method including providing a rotor disk having a central body portion and having a through hole formed therein, and a plurality of spaced apart teeth extending radially from the central body portion, wherein each tooth of the plurality of teeth includes an elongated stem portion having a first end at the central body portion, and wherein the elongated stem portion extends radially to a second end terminating at a transverse portion, the transverse portion may have a general arch shape and extending in a first direction from a first side edge of the stem portion and extending in an opposite second direction from a second side edge of the stem portion, a first end of the transverse portion having a first side face that is formed at a 90-degree angle with respect to a top face or a bottom face of the rotor disk and a second end of the transverse portion having a second side face that is formed at a 90-degree angle with respect to the top face or the bottom face, transverse portions of adjacent teeth forming a gap therebetween; trimming the first side face of the transverse portion so that the trimmed first side face forms an angle with the top face or bottom face that is not 90 degrees, and trimming the second side face of the transverse portion so that the trimmed second side face forms an angle with the top face or bottom face that is not 90 degrees.

BRIEF DESCRIPTION OF THE DRAWINGS

The exemplary embodiments will hereinafter be described in conjunction with the following drawing figures, wherein like numerals denote like elements, and wherein:

The exemplary embodiments will hereinafter be described in conjunction with the following drawing figures, wherein like numerals denote like elements, and wherein:

FIG. 5A is a partial side view of a method including stamping a rotor disk in accordance with an embodiment;

FIG. 5B is a partial side view of a method including trimming a first tooth of two adjacent teeth of a rotor disk in accordance with an embodiment; and FIG. 5C is a partial side view of a method including trimming a second tooth of two adjacent teeth of a rotor disk in accordance with an embodiment.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description.

Figure 1A:
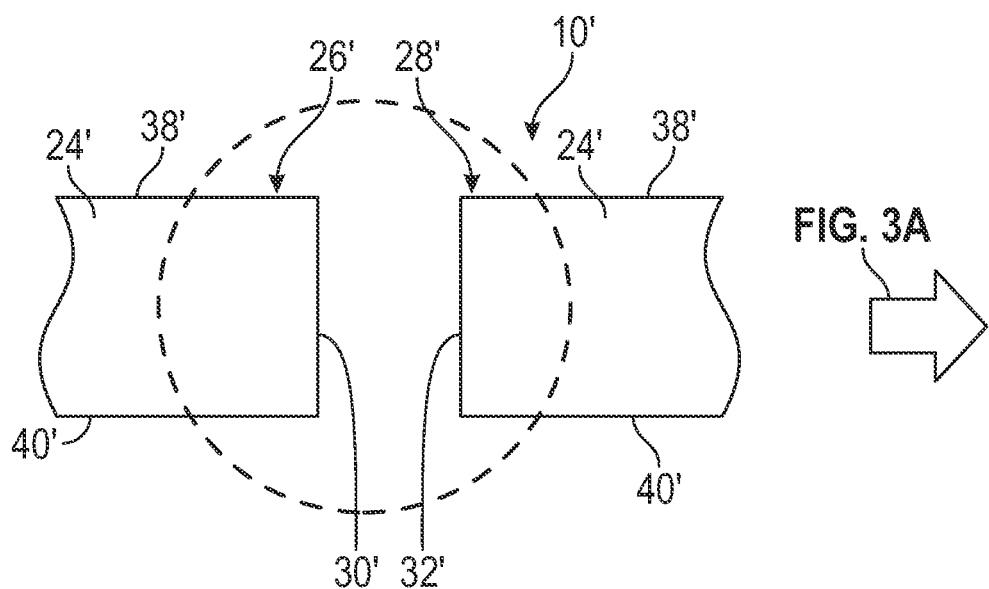
FIG. 1A is a partial, sectional view adjacent teeth of a rotor disk.
Figure 1B:
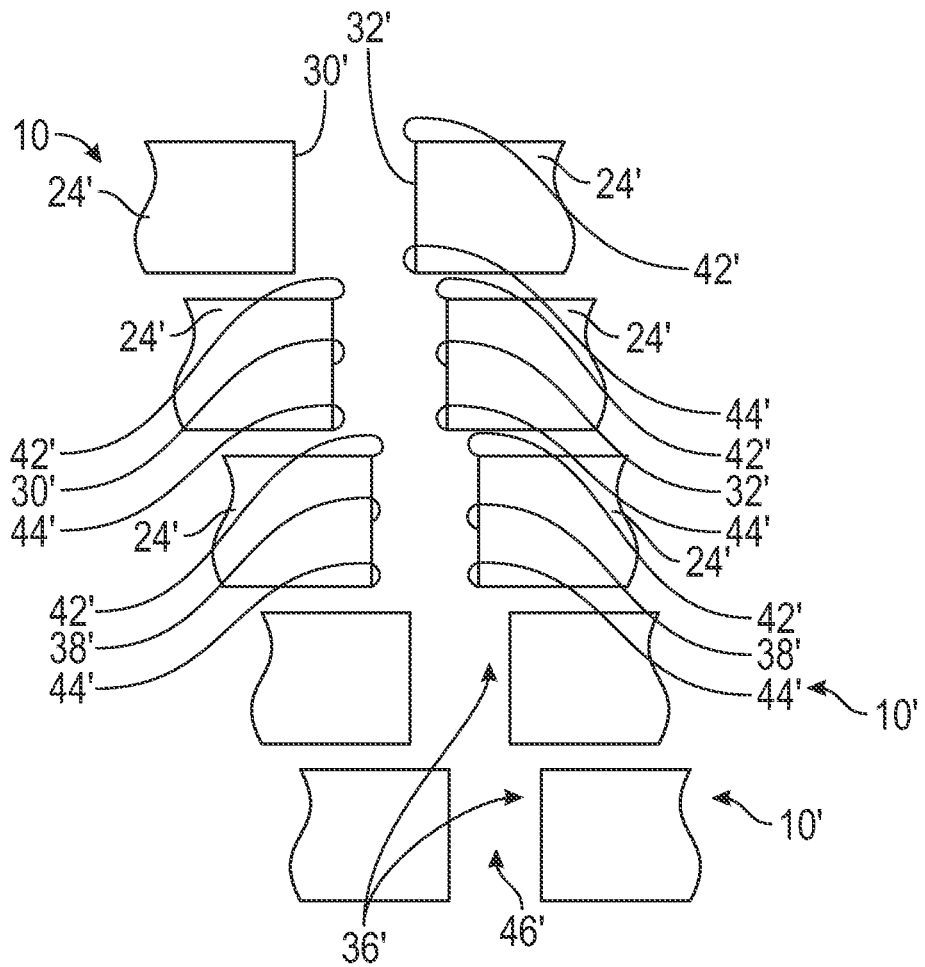
FIG. 1B is a partial, sectional view of a stack of rotor disks.

Referring to FIG. 1A, a rotor disk 10' may be formed by stamping a relatively thin flat piece of metal using a stamping tool that is moved in a perpendicular direction with respect to a top face 38' and an opposite bottom face 40' of the thin flat piece of metal 10'. The stamping process forms a rotor disk 10' wherein a first perpendicular edge 30' extends between the top face 38' and the opposite bottom face 40' of thin flat piece of metal at a first end 26' of a transverse portion 24' of a first tooth and a second perpendicular edge 32' extends between the top face 38' and the opposite bottom face 40' of thin flat piece of metal at a second end 28' of a transverse portion 24' of a second tooth immediately adjacent the first tooth. Referring to FIG. 1B, when plurality of rotors disk 10' are stacked together with adjacent rotors disks 10' being rotated with respect to each other the stack of rotors disks 10' forms a skewed channel 46' running the axial length of the stack of rotors disks. However, the top face 38', perpendicular edge 30', 32', and bottom face 40' at each end of the transverse portion 24' forms sharp corners 42', 44' which may damage conductive wire material as it is being wound around the stack of rotor disks.

Figure 2:
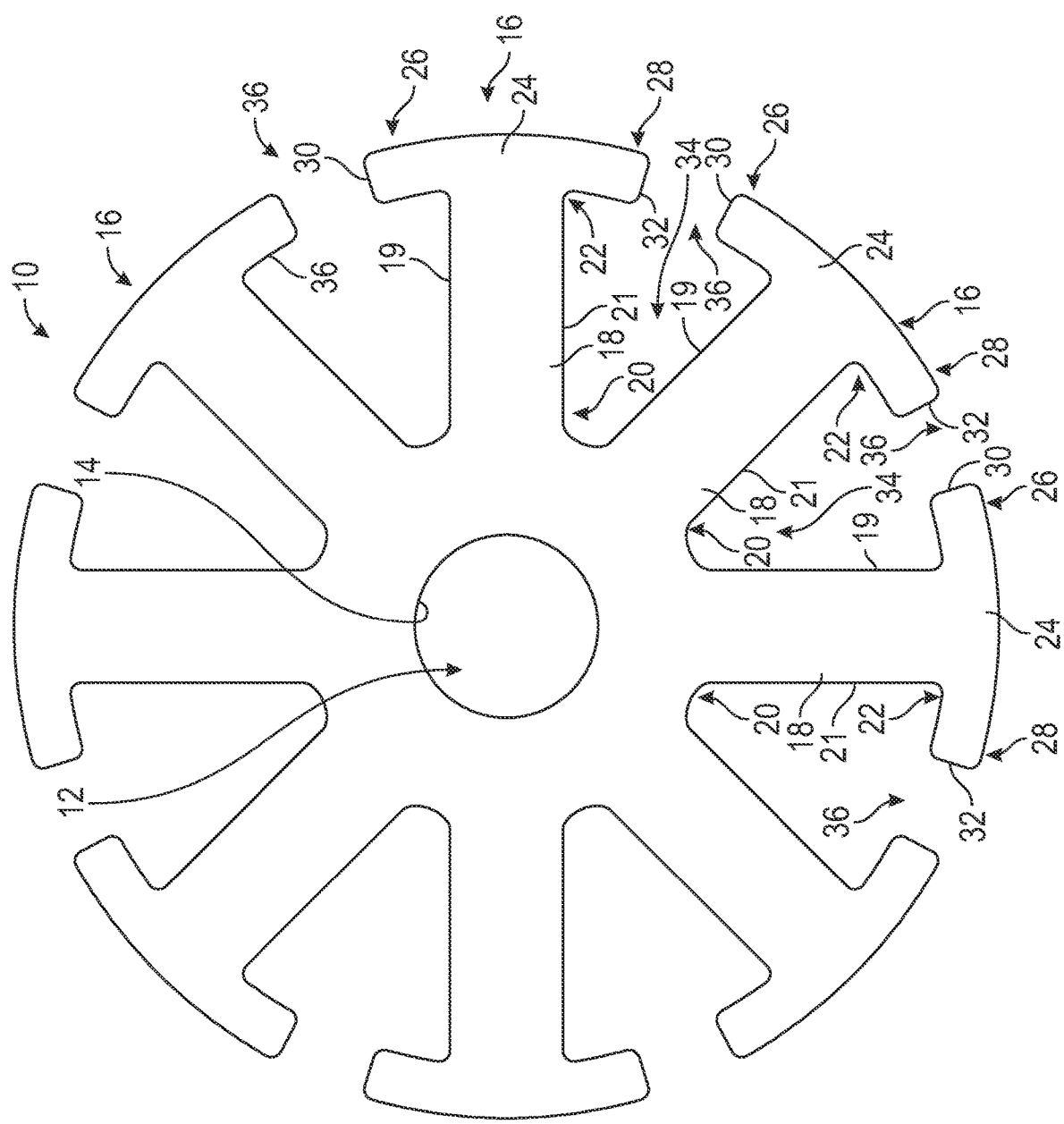
FIG. 2 is a plan view of a rotor disk in accordance with an embodiment.

FIG. 2 is a plan view of a rotor disk 10 in accordance with an embodiment. Variations of a rotor disk 10 may include a central body portion 12, which may have a generally annular shape and may have a through hole 14 formed therein to receive a shaft of an electric motor. A plurality of spaced apart teeth 16 may extend radially from the central body portion 14. Each tooth 16 may have a T like shape, wherein each tooth 16 may include an elongated stem portion 18 having a first end 20 at the central body portion 12. The stem portion 18 may extend radially to a second end 22 terminating at a transverse portion 24. The transverse portion 24 may have a general arch shape and may extend in a first direction from a first side edge 19 of the stem portion 18 and may extend in an opposite second direction from a second side edge 21 of the stem portion 18. Adjacent space apart teeth 16 may form a cavity 34 for receiving conductive wiring placed through the gap 36 between the transverse portion 24 of the adjacent teeth 16. The rotor disk 10 may be a unitary, single piece of stamped thin metal.

Figure 3A:
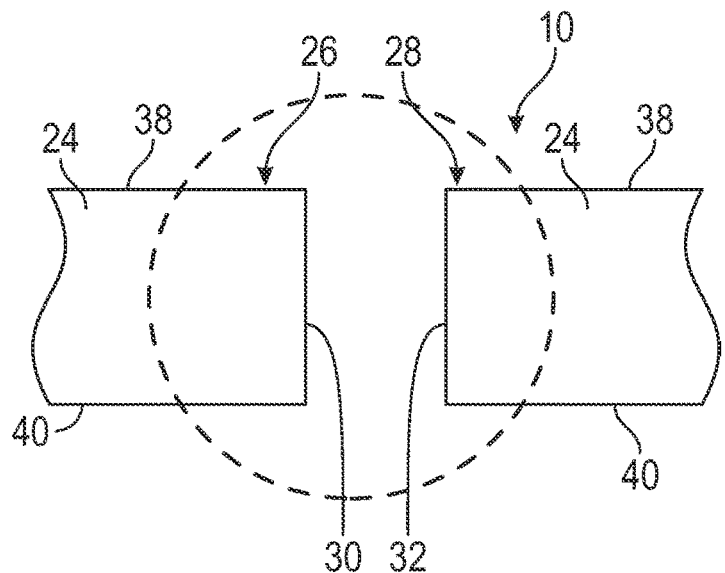
FIG. 3A is a partial, side view of adjacent teeth of a rotor disk in accordance with an embodiment.

Referring to FIG. 3A, a first end 26 and a second end 28 of the transverse portion 24 may be trimmed to provide a first side face 30 and second side face 32 that are not formed at a 90-degree angle with respect to the top face 38 of each traverse portion 24. In a number of variations, the angle A formed by the top face 38 and the first side face 30 is greater than 90 degrees, and the angle B formed by the top face 38 and the second side face 32 is less than 90 degrees. In a number of variations, the angle A formed by the top face 38 and the first side face 30 and the angle B formed by the top face 38 and the second side face 32 are supplementary or near supplementary to each other. In a number of variations, the first side face or edge 30 is parallel to the second side face or edge 32.

Figure 3B:
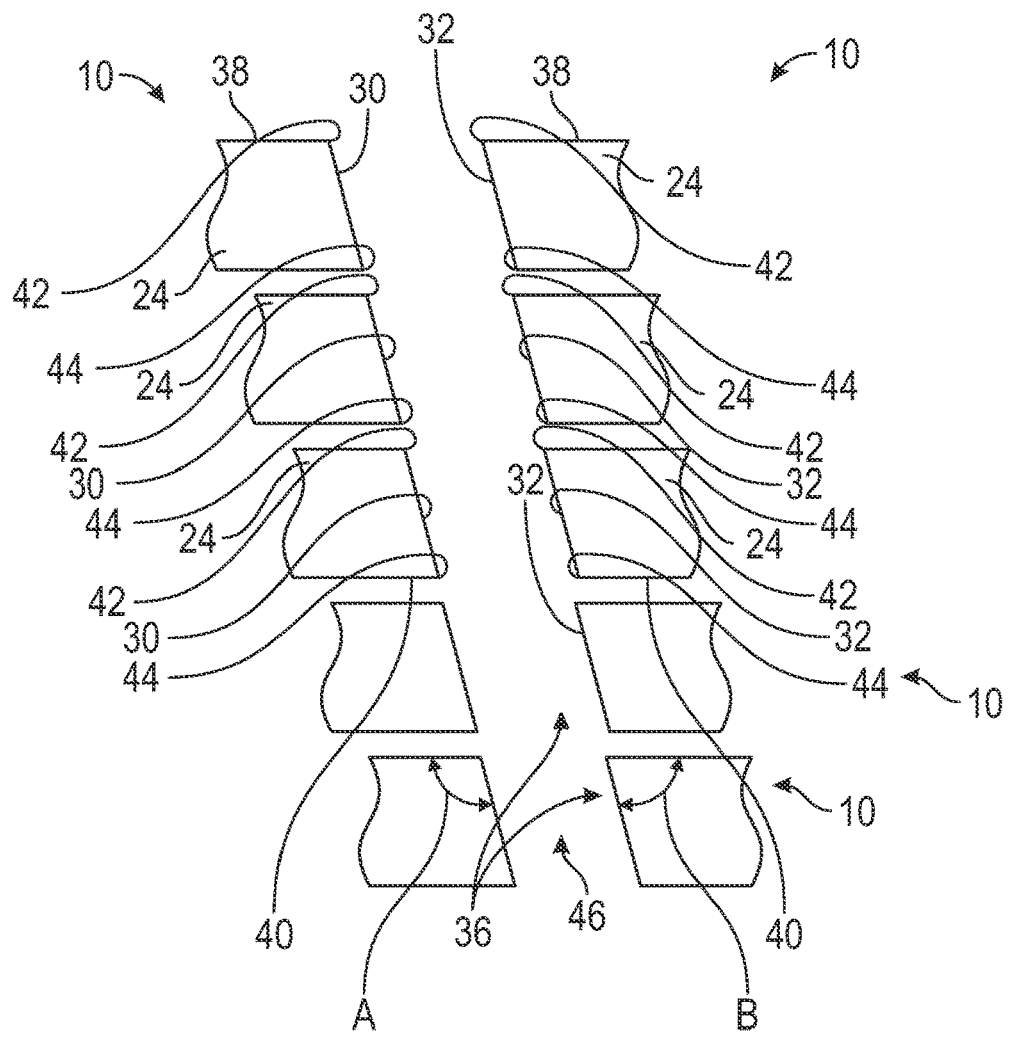
FIG. 3B is a partial, side view of a stack of rotor disks in accordance with an embodiment.

Referring to FIG. 3B, a number of variations may include a product including a plurality of rotor disks 10, as described in FIG. 3A, that are stacked on top of each other with each disk being rotated with respect to an adjacent disk so that a skewed channel 46 is formed by gaps 36 between the transverse portions 24 of adjacent teeth of each rotor disk 10. In a number of variations, the rotor disks are rotated so that a plurality of the first side faces 30 of a plurality of rotor disks are in a first imaginary plane, and plurality of the second side faces 32 are in a second imaginary plane, and wherein the first imaginary plane and second imaginary plane are parallel to each other. In a number of variations, the plurality of stacked rotor disks 10 that are stacked on top of each other wherein each disk is rotated with respect to an adjacent disk so that a skewed channel 46 is formed by gaps 36 between the transverse portions 24 of adjacent teeth of each rotor disk 10 and so that no sharp corners 42, 44, at the first end 26 or second end 28 respectively, are exposed in the skewed channel 46. The channel 46 is skewed with respect to a longitudinal axis running through the stacked rotor disk.

Figure 4:
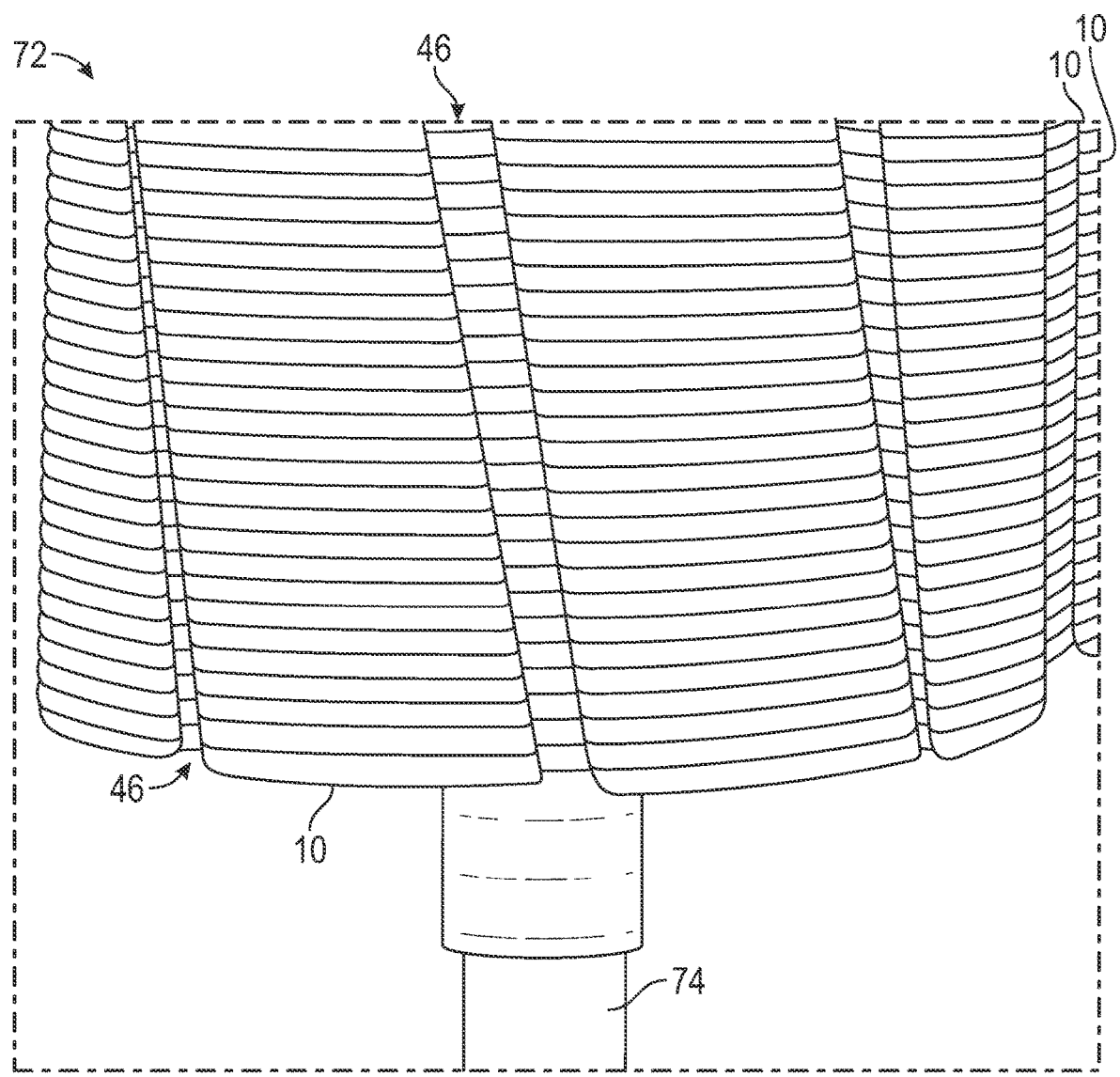
FIG. 4 is a partial, side view of a rotor including a plurality of stacked rotor disks having a motor shaft received therein in accordance with an embodiment.

Referring to FIG. 4, a number of variations may include a rotor 72 including a plurality of rotor disks 10 that are stacked on top of each other with each disk being rotated with respect to an adjacent disk so that a skewed channel 46 is formed by gaps 36 between the transverse portions 24 of adjacent teeth of each rotor disk 10 and so that no sharp corners 42, 44, at the first end 26 or second end 28 respectively, are exposed in the skewed channel 46. The plurality of disks may be laminated together with a dielectric material. An electric motor shaft 74 may be received in and fixed to the plurality of disks 10. The channel 46 is skewed with respect to a longitudinal axis running through the stacked rotor disk. A vehicle my include an electric motor having the electric motor shaft 74 fixed to the plurality of rotor disks 10 stacked on top of each other with each disk being rotated with respect to an adjacent disk so that a skewed channel 46 is formed by gaps 36 between the transverse portions 24 of adjacent teeth of each rotor disk 10 and so that no sharp corners 42, 44, at the first end 26 or second end 28 respectively, are exposed in the skewed channel 46.

Referring to FIGS. 5A, 5B, and 5C, a number of variations may include a method of stamping a unitary, single piece of thin metal 8 into a rotor disc 10 useful in an electric motor. The method of stamping may produce a rotor disk 10 as described with respect to FIGS. 2, 3A, 3B and 4. As illustrated in FIG. 5A, a thin piece of metal 8 may be placed on a stamping base 48 having a through hole or recess 50 formed therein. A bottom face 40 of the thin piece of metal 8 may rest on the stamping base 48 and a stamping tool 52 may be moved toward the thin piece of metal 8 to engage the top face 38 thereof. The stamping tool 52 may have an elongated projection 51 having a first side face 54 and the second side face 56 which are perpendicular to the top face 38 of the thin piece of metal 8. The stamping tool 52 may be advanced so that the first elongated projection 51 cuts through the thickness of the thin piece of metal 8.

In a number of variations, the method illustrated by FIG. 5A may be used to produce a rotor disk as illustrated and described with respect to FIG. 2. However, the methods described hereafter with respect to illustrations in FIGS. 5A-5B may be carried out on a prefabricated rotor disk as described with reference to FIG. 2 wherein the first end 26 of a transition portion 24 of a first tooth may be overcut with respect to a 90 degree angle from the top face 38 of the rotor disc, and an opposing second end 28 of the transition portion 24 of a second immediately adjacent tooth maybe undercut with respect to a 90 degree angle from the top surface 38 other rotor disk.

As illustrated in FIG. 5B, the rotor disk produced by the method described above with reference to FIG. 5A or a pre-fabricated rotor disk by another method may be placed on a first tool base 64. A first stamping tool 58 may be provided having a first elongated projection 57 with a first side face 60 performed at an angle which is not 90 degrees with respect to the top face 58 of the thin piece of metal 8. The first elongated projection 57 may include a second side face 62 which is formed at an angle perpendicular to the top face 38 of the thin piece of metal 8 (rotor disk) and so that the second side face 62 of the first elongated projection 57 may be moved along a second side face 30' of the thin piece of metal 8 which was cut by the first stamping tool 52. As the first stamping tool 58 is advanced through the piece of metal 8 the first side face 60 trims the second end 32 of the transverse portion 24 of a first tooth of adjacent teeth to provide a trimmed second side face 32 of the transverse portion 24. The trimmed second side face 32 and the top face 38 of the transverse portion 24 form an angle which is not 90 degrees.

As illustrated in FIG. 5C, thereafter, the thin piece of metal 8 (rotor disk) with the trimmed second side face 32 may be placed over a second stamping tool 66 which may include a second elongated projection 61 having a first side edge 68 constructed and arranged to slide along or avoid contact with the second side face 32 of the transverse portion 24 of the first tooth that was cut by the second stamping tool 58. The second elongated projection 61 may have a second side face 70 formed at an angle that is not 90 degrees with respect to the bottom face 40 of the transverse portion 24. A second stamping base 76 may be advanced towards the thin piece of metal 8 (rotor disk) pressing the same against the second cutting tool 61 so that a trimmed first side face 30 of the transverse portion 24 of the second tooth of adjacent teeth is cut at an angle which is not 90 degrees with respect to the top face 38 of the transverse portion 24. A plurality of rotor disks 10 may be formed using the method steps illustrated in FIGS. 5A, 5B and 5C. The method may further include stacking the plurality of disks on top of each other and rotating each adjacent disks so that the gap 36 between transverse portions 24 of adjacent teeth form a skewed channel 46 running the axial length of the stack of plurality of rotor disks 10 as illustrated in FIG. 4. The plurality of rotor disks 10 may be laminated together and an electric motor shaft 74 may be received in the through hole 14 formed in each rotor disk.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

While at least one exemplary embodiment has been presented in the foregoing detailed description, it should be appreciated that a vast number of variations exist. It should also be appreciated that the embodiments are only examples, and are not intended to limit the scope, applicability, or configuration of the disclosure in any way. Rather, the foregoing detailed description will provide those skilled in the art with a convenient road map for implementing the embodiments. It should be understood that various changes can be made in the function and arrangement of elements without departing from the scope of the disclosure as set forth in the appended claims and the legal equivalents thereof.

What is claimed is:

1. A product, comprising:
   rotor disk having a central body portion and having a through hole formed therein, and a plurality of spaced apart teeth extending radially from the central body portion, wherein each tooth of the plurality of teeth includes an elongated stem portion having a first end at the central body portion, and wherein the elongated stem portion extends radially to a second end terminating at a transverse portion, the transverse portion having a general arch shape and extending in a first direction from a first side edge of the stem portion and extending in an opposite second direction from a second side edge of the stem portion, a first end of the transverse portion having a first side face that is not formed at a 90-degree angle with respect to a top face of the rotor disk or a bottom face of the rotor disk and a second end of the transverse portion having a second side face that is formed at a 90-degree angle with respect to the top face of the rotor disk or the bottom face of the rotor disk, transverse portions of adjacent teeth forming a gap therebetween.

2. The product of claim 1 wherein an angle A formed by the top face of the rotor disk and the first side face of the transverse portion is greater than 90 degrees and further comprising a first stamping tool having a first elongated projection received in the gap, the first elongated projection having a first side face formed at an angle which is not 90 degrees with respect to the top face or the bottom face of the rotor disk, the first elongated projection having a second side face which is formed at an angle perpendicular to the top face of rotor disk.

3. The product of claim 1 wherein an angle A formed by the top face of the rotor disk and the first side face of the first end of the transverse portion and an angle B formed by the top face of the rotor disk and the second side face of the second end of the transverse portion are supplementary or near supplementary to each other.

4. The product as set forth in claim 1 wherein the central body portion has a generally annular shape.

5. The product as set forth in claim 1 wherein the rotor disk is a unitary, single piece of stamped thin metal.

6. A product, comprising:
   a rotor disk having a central body portion and having a through hole formed therein, and a plurality of spaced apart teeth extending radially from the central body portion, wherein each tooth of the plurality of teeth includes an elongated stem portion having a first end at the central body portion, and wherein the elongated stem portion extends radially to a second end terminating at a transverse portion, the transverse portion having a general arch shape and extending in a first direction from a first side edge of the stem portion and extending in an opposite second direction from a second side edge of the stem portion, a first end of the transverse portion having a first side face that is not formed at a 90-degree angle with respect to a top face of the rotor disk or a bottom face of the rotor disk and a second end of the transverse portion having a second side face that is not formed at a 90-degree angle with respect to the top face or the bottom face, transverse portions of adjacent teeth forming a gap therebetween; and
   a first stamping tool having a first elongated projection received in the gap, the first elongated projection having a first side face formed at an angle which is not 90 degrees with respect to a top face of the first stamping tool, the first elongated projection having a second side face which is formed at an angle perpendicular to the top face of the first stamping tool.

7. The product as set forth in claim 6 wherein the top face of the rotor disk, first side face of the rotor disk, bottom face of the rotor disk, and second side face of the rotor disk do not form sharp corners exposed in the gap.

8. The product as set forth in claim 6 further comprising a stamping tool base engaging the bottom face of the rotor disk.

9. The product of claim 6 wherein an angle A formed by the top face of the rotor disk and the first side face of the transverse portion is greater than 90 degrees, and an angle B formed by the top face of the rotor disk and the second side face of the transverse portion is less than 90 degrees.

10. The product of claim 6 wherein an angle A formed by the top face of the rotor disk and the first side face of the transverse portion and an angle B formed by the top face of the rotor disk and the second side face of the transverse portion are supplementary or near supplementary to each other.

11. The product as set forth in claim 6 wherein the central body portion has a generally annular shape.

12. The product as set forth in claim 6 wherein each rotor disk is a unitary, single piece of stamped thin metal.

13. A method comprising:
providing a rotor disk having a central body portion and having a through hole formed therein, and a plurality of spaced apart teeth extending radially from the central body portion, wherein each tooth of the plurality of teeth includes an elongated stem portion having a first end at the central body portion, and wherein the elongated stem portion extends radially to a second end terminating at a transverse portion, the transverse portion having a general arch shape and extending in a first direction from a first side edge of the stem portion and extending in an opposite second direction from a second side edge of the stem portion, a first end of the transverse portion having a first side face that is formed at a 90-degree angle with respect to a top face of the rotor disk or a bottom face of the rotor disk and a second end of the transverse portion having a second side face that is formed at a 90-degree angle with respect to the top face of the rotor disk or the bottom face of the rotor disk, transverse portions of adjacent teeth forming a gap therebetween;

providing a first stamping tool having a first elongated projection having a first side face formed at an angle which is not 90 degrees with respect to a top face of the first stamping tool, the first elongated projection having a second side face formed at an angle perpendicular to the top face of the first stamping tool;

trimming, using the first stamping tool, the first side face of the transverse portion so that a trimmed first side face forms an angle with the top face of the rotor disk or bottom face of the rotor disk that is not 90 degrees; and trimming, using the first stamping tool, the second side face of the transverse portion so that the trimmed second side face of the transverse portion forms an angle with the top face of the rotor disk or bottom face of the rotor disk that is not 90 degrees.

14. The method of claim 13 wherein an angle A formed by the top face of the rotor disk and the trimmed first side face is greater than 90 degrees, and an angle B formed by the top face of the rotor disk and the trimmed second side face is less than 90 degrees.

15. The method of claim 13 wherein an angle A formed by the top face of the rotor disk and the trimmed first side face of the transverse portion and an angle B formed by the top face of the rotor disk and the trimmed second side face of the transverse portion are supplementary or near supplementary to each other.

16. The method of claim 13 wherein trimming the second side face of the transverse portion comprises moving the first stamping tool toward the bottom face of the rotor disk so that the second side face of the first elongated projection is perpendicular to the bottom face of the rotor disk.

17. The method of claim 13 wherein trimming the first side face of the transverse portion comprises moving the first tamping tool toward the top face of the rotor disk so that the second side face of the first elongated projection is perpendicular to the top face of the rotor disk.

18. The method of claim 13 wherein an angle A formed by the top face of the rotor disk and the first side face of the rotor disk and an angle B formed by the top face of the rotor disk and the second side face of the rotor disk are supplementary or near supplementary to each other.

19. The method as set forth in claim 13 wherein the central body portion has a generally annular shape.

20. The method as set forth in claim 13 wherein each rotor disk is a unitary, single piece of stamped thin metal.

\* \* \* \* \*